United States Patent [19]

Brewer

[11] 3,757,039

[45] Sept. 4, 1973

[54] SURVEILLANCE AND CRIME-DETERRENT SYSTEM

[76] Inventor: Joseph A. Brewer, 4314 Elwood Dr. West, Tacoma, Wash.

[22] Filed: Feb. 11, 1970

[21] Appl. No.: 114,585

[52] U.S. Cl. .............. 178/6.8, 74/229, 178/DIG. 38

[51] Int. Cl. .............................................. H04n 7/18

[58] Field of Search ............. 178/DIG. 31, DIG. 38, 178/7, 81; 200/21, 27, 30, 33, 33 C, 33 B, 37 A; 74/112, 229, 393

[56] References Cited

UNITED STATES PATENTS

| | | | |
|---|---|---|---|
| 3,535,442 | 10/1970 | Jennings | 178/7.81 |
| 2,382,052 | 8/1945 | Gram | 200/27 |
| 3,580,998 | 5/1971 | Hammond et al. | 178/DIG. 38 |
| 149,336 | 4/1874 | Richards | 74/229 |

*Primary Examiner*—Robert L. Griffin
*Assistant Examiner*—Joseph A. Orsino, Jr.
*Attorney*—Richard W. Seed et al.

[57] ABSTRACT

A surveillance and crime-deterrent system having several CCTV cameras with scanning motors hanging in a sales area which has one or more monitors for customer viewing of scenes viewed by the cameras, and which automatically random-selects the camera being monitored, varies the duration of the viewing periods, and varies the frequency and duration of the scanning cycle of the cameras.

1 Claim, 4 Drawing Figures

INVENTOR.
JOSEPH A. BREWER
BY
Christensen & Sanborn
ATTORNEYS

INVENTOR.
JOSEPH A. BREWER

BY
Christensen & Sanborn

ATTORNEYS

SURVEILLANCE AND CRIME-DETERRENT SYSTEM

BACKGROUND OF THE INVENTION

The present invention relates to an improved surveillance and crime-deterrent system for viewing selected areas of a store and for providing psychological deterrence to potential shoplifters, employee pilferers and armed robbers.

In the past, closed circuit television (CCTV) systems have been used in business establishments as a psychological deterrent to shoplifting and pilferage. Deterrence is achieved by locating CCTV monitors in locations where they can be readily viewed by the public, and by the mounting of CCTV cameras which provide selected scenes of the establishment for public viewing on the monitors. These cameras have commonly been concealed in respective enlarged housings suspended from the overhead structure so as to be in full view of the public, and normally attention has been directed to these housings as by use of small flashing lights mounted thereon. The housings have not only had the live lens of the housed camera but several simulated (dummy) lenses spaced at intervals about the housing to give the impression to the public that several cameras are in operation in each housing. Exemplary of such housings are those shown in Design Patents D-203,597 and D-203,678.

In past crime deterrent systems utilizing such CCTV camera housings it has been the usual practice to enlarge the surveillance illusion, not only by providing dummy lenses in the camera housings but to also use completely dummy housings which so closely simulate the "live" housings that the public is led to believe that all are actively involved in the surveillance system.

The effectiveness of the above described basic camera crime deterrent system tends to diminish as time passes and has been improved somewhat in some installations by providing rotational capability to the camera housings for horizontal scanning and operating it by remote control from a monitoring station. When only manual, such remote control is normally prohibitively expensive in terms of labor. When automated, the remote control has consisted only in an obviously automatic scanning arrangement in which the camera housings oscillate between stops at the ends of a preset horizontal arc either in steps or in uninterrupted travel through the span of the arc as described in U.S. Pat. No. 3,535,442. Such a system although superior to one having static camera housings has predictable aspects and hence also diminishes in effectiveness as time passes.

The present invention aims to provide a crime-deterrent and surveillance system of the above described type which has markedly improved effectiveness, particularly as time passes after initial installation, and yet is economical as respects both operation and equipment cost.

A further object is to provide an improved automatic random selector suitable for use in such a system.

DETAILED DESCRIPTION OF THE INVENTION

Figure 1:
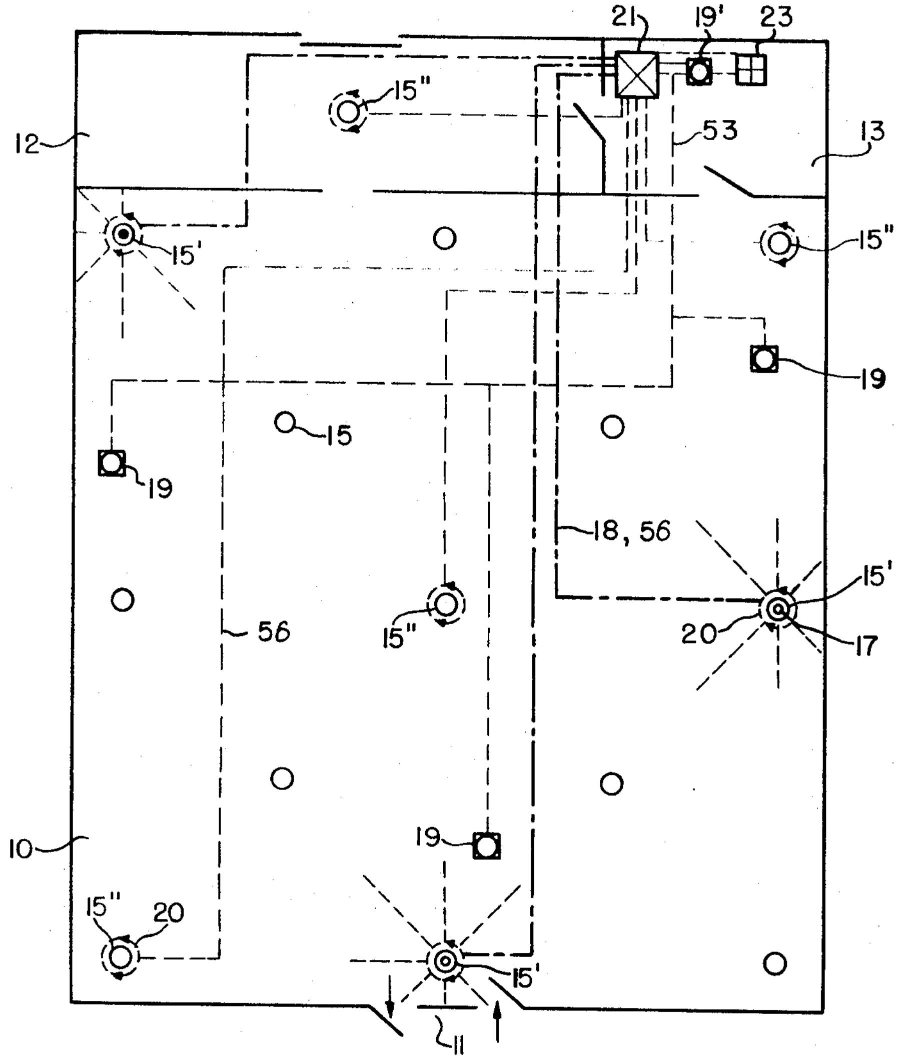
FIG. 1 is a schematic representation of a surveillance and crime-deterrent system made in accordance with the present invention and installed in a store whose floor plan is outlined in full lines.

For purposes of example, in FIG. 1 there is illustrated the layout of a retail establishment having a main salesroom 10 with an outside entrance 11, a stockroom 12, and a manager's office 13. Suspended from the ceiling as by respective rods are a plurality of camera housings 15 each having several circumferentially spaced apertures aimed in different sectors and at about 20° to 30° downwardly from the horizontal and may be as shown, for example, in the aforementioned patents.

Most of these housings 15 are empty (dummys). However, selected of them, denoted 15', each have a television camera 17 mounted therein which has its lens aligned with one of the apertures so as to sight therethrough. It is impossible to detect that most of the housings and most of the apertures are dummys.

In the illustrated layout three of the housings in the sales room 10 contain cameras, one being located to view the checkout area near the entrance and the other two to eye different sales areas. The camera equipped housings are rotationally mounted to be turned for scanning at about 1 r.p.m. between predetermined stops by a self-reversing electric motor and drive mechanism, designated 20, which may, for example, be as shown in U.S. Pat. No. 3,535,342 or 3,427,753. Some of the dummy housings, designated 15'', are also rotatably mounted. For purposes of example, three dummy housing in the salesroom and one in the stockroom, have been made rotational. These are selected to "observe" store zones not within close range of the live units.

Figure 3:
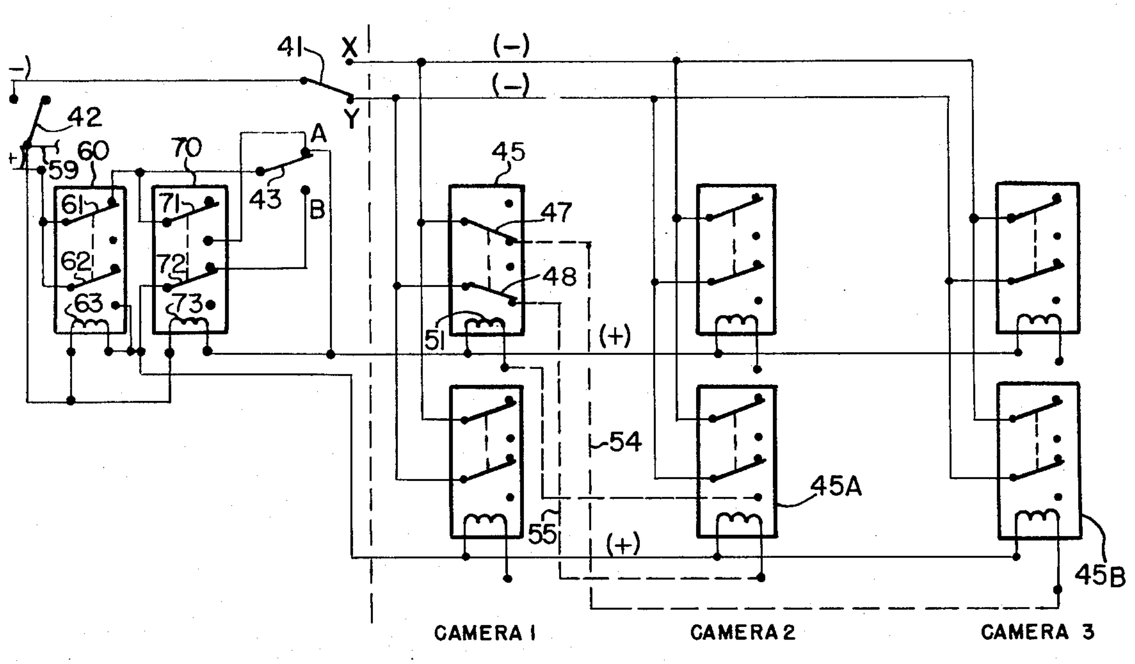
FIG. 3 is a fragmentary schematic of the electrical portion of the control system.

Located in the office 13 or other secure location is an automatic random control system which is electrically connected to the motors of rotators 20 of the camera housings 15' and 15'', the CCTV monitors 19 and 19', and the CCTV cameras 17. For purposes of example there is illustrated in the drawings a control system comprising a novel random switching device (FIG. 4) and a logic section (FIG. 3).

The switching device includes a drive pulley 32 driven at slow speed in any suitable manner, a variable-radii idler pulley 33, and two intermittently-driven pick-up pulleys 34–35, together with an elastic belt 31 which continuously provides power interconnection between the pulleys 32–33. The pulleys 33, 34 and 35 have their shafts coupled respective to a select cam 37, a scanning cam 38 and a cycle cam 39 which in turn operate a respective select switch 41, a scanning switch 42, and a cycle switch 43.

Figure 4:
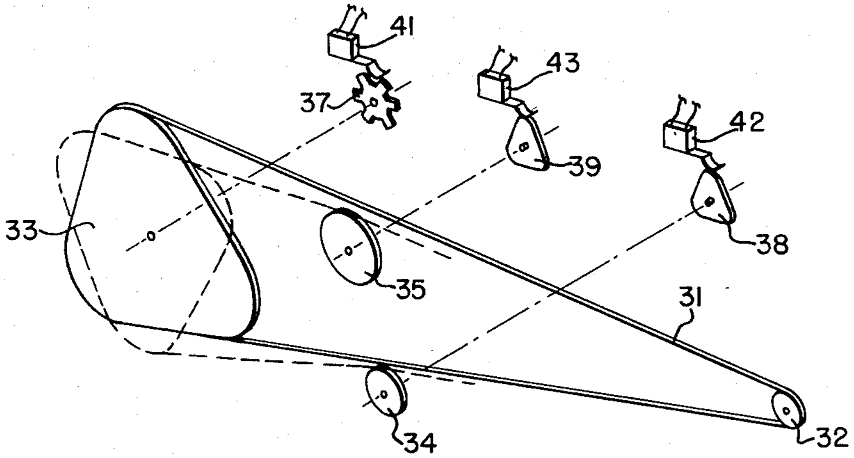
FIG. 4 is an exploded perspective of the random switching section of the control system.

The idler 33 is shaped to shift the two runs of the elastic belt 31 in and out relative to the center line between the rotational centers of the pulleys 32–33 as can be seen by comparing the full line and broken line positions of these runs as viewed in FIG. 4. The result of this shifting of the belt runs is to bring the belt intermittently into driving contact with the pulleys 34–35.

The belt shifting can be accomplished by a vast variety of peripheral shapes to the pulley 33. In the illustrated example this pulley has three lobes which may be of varying radii and circumferential extent to vary the driven periods of the pulleys 34–35. It will be noted that when one of the lobes is aimed generally at right angles to the upper run as shown by the full line position of FIG. 4, the upper run is shifted out of engagement with the pulley 35, whereas by the time that a flat between lobes is directed toward the upper run as shown by the broken line position in FIG. 4, the upper run of the belt has been brought into driving engagement with the pulley 35.

A similar effect, but in reverse, is accomplished between the lower run of the belt 31 and the pulley 34; i.e., the belt is shifted inwardly out of engagement with the pulley 34 when a flat is directed toward the lower run as shown by the full line position in FIG. 4 and the pulley 34 is driven when the lobes of pulley 33 are directed toward the lower run as indicated by the broken line position in the drawing. The positions of the pulleys 34–35 are arranged such that the pulley 34 is driven more per revolution of the idler 33 than the pulley 35, and since the pulley 34 is also of a smaller diameter than the pulley 35, the scanning cam 38 rotates at a greater rate than the cycle cam 39.

The cams 38–39 may have lobes of varying circumferential span so as to further compound the random effect and the number of lobes can be varied. As indicated in FIG. 3, the scanning switch 42 is an on-off switch whereas the cycle switch rocks between two poles, designated A-B, of like polarity, designated positive in the schematic. Similarly, the select switch 41 rocks by action of equally spaced lobes on the cam 37 between two negative poles, denoted X-Y.

For purposes of example there is illustrated in FIG. 3 a relay type of logic section which is connected to the select switch 41 and cycle switch 43 for random operation of the three "live" camera units 15'. Understanding of the system is expedited if it is kept in mind that the select switch determines which CCTV camera will have its output viewed on the monitors, whereas the cycle switch determines when the next camera starts its monitor cycle. In other words, the select switch determines "which camera next" and the cycle switch determines "when." The system is also arranged so that while a camera has its scene being viewed on the monitors, it may be undergoing a scanning movement during a random portion of its cycle.

Each camera is represented in the logic section by two transfer relays 45 located in upper and lower relay banks as viewed in the drawing. The coils of these two relays connected, one to pole A and the other to pole B, and each relay has one swich 47 connected to pole X and another switch 48 connected to pole Y. The active poles of these two switches 47, 48 are connected in the other relay bank to the relay coils 51 for different of the other two cameras. An example is illustrated schematically in FIG. 3 wherein camera 1 is being monitored and has its switches 47, 48 connected to the negative polarity ends of the coils of relays 45A and 45B in the lower bank of the other two cameras. If the cycle switch 43 moves to pole B before the select switch moves to pole X, then the relay coil in the lower bank for camera 2 will be activated and camera 2 will start its monitor cycle next. If on the other hand the select switch moves to pole X before the cycle switch moves to pole B, then the relay coil in the lower bank for camera 3 will be activated when the cycle switch 43 moves to pole B, and camera 3 will start its cycle next.

The example thus far described has been with the assumption that the scanning switch 42 remained open as shown in FIG. 3. However, if the scanning switch is closed when the cycle switch is switched from one of its poles A-B to the other, relays 60, 70 come into play to prevent the monitoring from shifting to another camera. The result is that the monitor period for the camera is extended until such time as the scanning period terminates. Such an extension occurs at random and correspondingly shortens the monitor period of the next camera as selected by switch 41. As a consequence the possible variance in length of the monitor period of the cameras is significantly increased over that which would be accomplished solely by action of the cycle cam 39.

Elaborating on the operation of the relays 60 and 70, while the cycle switch 43 is at pole A as shown in FIG. 3, if the scanning switch 42 closes, the coil 73 of relay 70 is energized thereby causing switch 72 to open and deactivate pole B, and causing switch 71 to close and bypass the cycle switch 43. As a consequence, if the cycle switch is then moved to pole B, no further change in monitoring will occur until the scanning switch 42 again opens.

If on the other hand, the cycle switch is at pole B and then the scanning switch 42 closes, coil 63 of the relay 60 is energized causing switch 61 to open and switch 62 to close. The opening of switch 61 opens the circuit to pole A whereas the closing of switch 62 bypasses the cycle switch 43. Hence, if the cycle switch is then moved to pole A, no further change in monitoring will occur until the scanning switch opens again.

Figure 2:
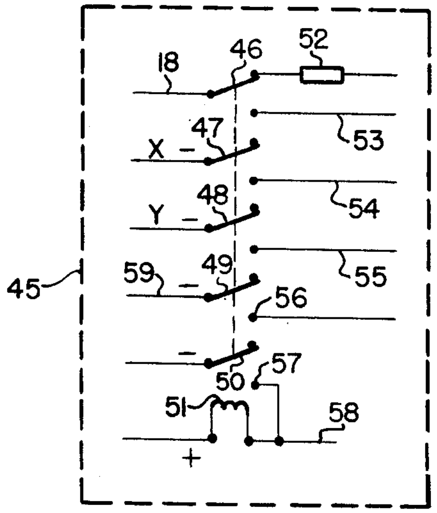
FIG. 2 is a schematic of one of the transfer relays in the logic section of the control system.

The transfer relays in the logic section each not only have the switches 47–48 from poles X-Y, but, as indicated in FIG. 2, also include switches 46, 49 and 50 which are closed when the relay coil 51 is energized. Switch 50 performs a latching function through 57. Switch 46 connects the viewing circuit 18 of the respective camera with a dissipating resistor circuit 52 when the camera is not being monitored, and connects the viewing circuit with the lead 53 to the monitoring circuit when the relay is activated. Switch 49 connects with the lead 59 from the scanning switch to close the circuit 56 of the rotator for the camera being monitored.

At the control station there is preferably also provided a video tape transmitter-transcriber 23 or the like coupled to the control system 21 to be used for in-store advertising on the monitors 19 and to record incidents viewed by the cameras 17. The system may also be connected to a central CCTV transmitter directing advertising for several establishments. A suitable manual override is provided in the control system to permit manual control of the rotators 20 for the camera housings and for operation of the unit 23.

It will be understood that the system of the present invention can be applied to more store areas, cameras and monitors than has been illustrated for purposes of example. For practical purposes of achieving the desired results and capabilities a minimum of three CCTV cameras will be used.

When the system is under automatic control, each of the CCTV monitors will continuously display an area observed by one of the CCTV cameras in the system. The scene displayed on all monitors may be identical or may be simultaneously transmitted from different cameras to the individual monitors. After an interval the scene displayed on the monitors changes to an area observed by one of the other CCTV cameras of the system. The duration of scene displays varies continuously. Periodically, and while the scene from a given camera is being displayed, automatic scanning occurs with the consequent and simultaneous display of motion on the monitors. Each of the dummy housings 15″ provided with rotators 20 can have its rotator circuits coupled with one of the rotator circuits of a live housing 15′, or be operated by one or more additional scanning cameras in the random switching unit. When the system is being operated in the manual override mode, the camera selected for surveillance viewing is selected manually and the area observed is, in the illustrated example, displayed on all monitors simultaneously. If desired, the system can be made to permit automatic operation and manual operation to occur simultaneously without interfering with or interference from the other mode, so that the area observed by a manually selected camera will be displayed only on monitor(s) which are used for surveillance.

The random patterns of camera selection for public viewing, camera selection for automatic scanning, varying duration of scene displays, and varying duration and frequency of automatic scanning in the described system defy human logic or anticipation, and create the unmistakeable impression that the system is being manually controlled at all times, and that live monitoring is going on continuously.

The embodiments of the invention in which an exclusive property or privilege is claimed are defined as follows:

1. A surveillance and crime-deterrent system comprising a plurality of spaced closed circuit television cameras in a given area, respective scanning means independently rotating the cameras, a closed circuit television monitor in the area, a remote control station, electrical circuits from the cameras, monitor and scanning means to the control station, automatic random control means at the remote control station connected to said circuits for random connecting the monitor to the cameras for random length monitoring periods and for operating the scanning means for random-length scanning periods during various of the monitoring periods of the cameras, said random control means comprising switching means including two independent switches one of which is a select switch operating to select the next camera to be viewed, and the other of which is a cycle switch normally determining the monitoring period of the selected camera, and means for operating said cycle switch at random intervals comprising driving and driven rotary members, a cam arranged to operate the cycle switch responsive to rotation of the cam, a cam idler coupled to the cam and located between said members, an elastic endless belt operatively connecting said rotary members, one of said members having varying radii around the circumference contacted by said belt so as to shift one of the runs of the belt into and out of engagement with said idler cam as said members rotate.

* * * * *